UNITED STATES PATENT OFFICE 2,342,487

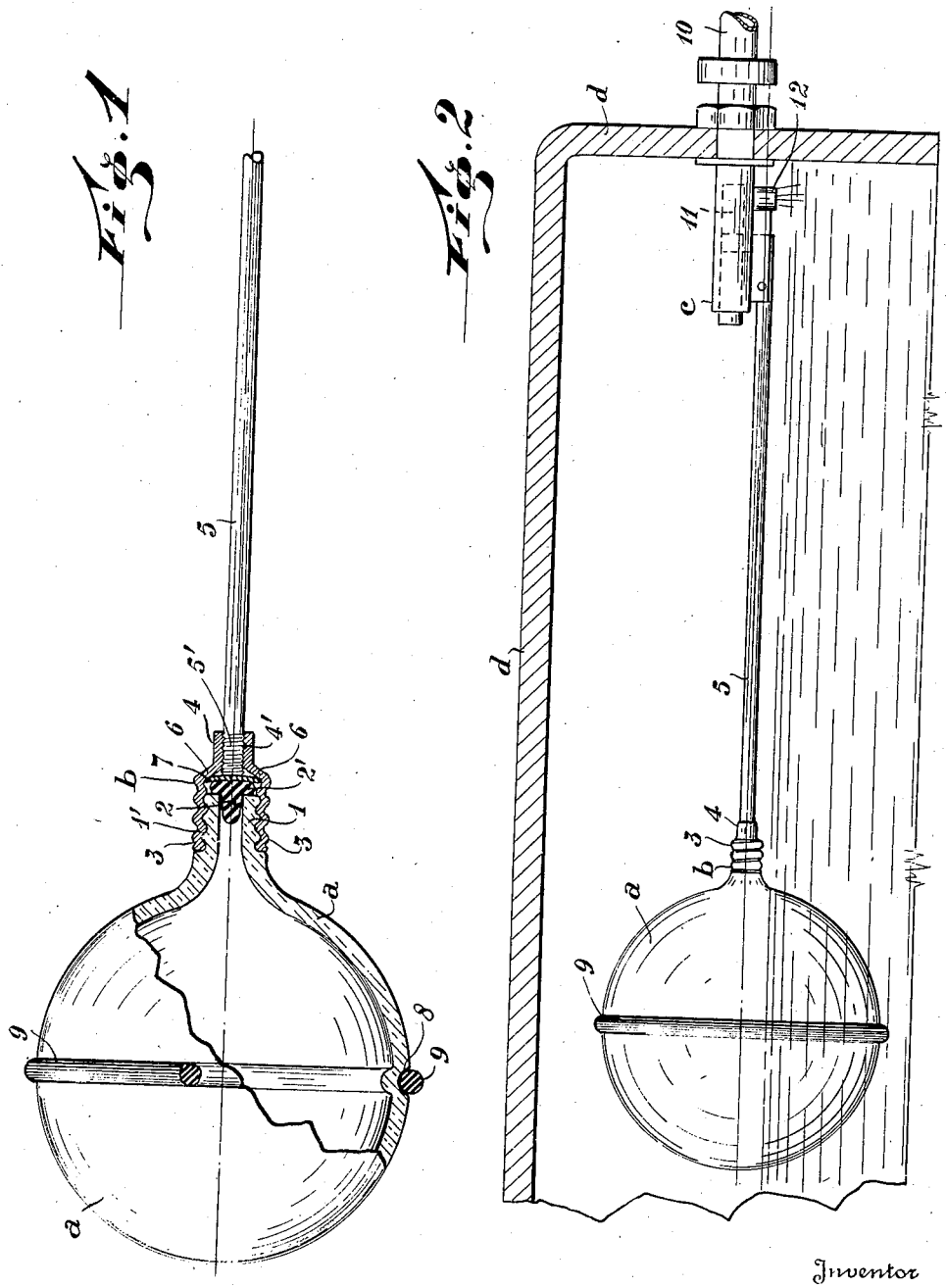

FLOAT STRUCTURE

Francisco Diaz Posada, Buenos Aires, Argentina

Application October 10, 1942, Serial No. 461,523
In Argentina November 5, 1941

4 Claims. (Cl. 137—104)

This invention relates to float structures, and particularly to improvements in floats for valves.

The main object of the present invention is to overcome the disadvantages of the metal valve floats used heretofore, due to their corrosive nature, by replacing said metal float for a glass float which will have an unlimited life in view of the nature of glass, which will not alter through contact with water or air.

A further object of the invention is to provide means whereby the float fittings may be readily replaced, thus making it possible to repair any damages caused by the use thereof without requiring the replacement of the main glass body constituting the float proper.

A further object of the invention is to provide means which apart from acting as a closure for the glass float, will also serve as a means for connection to the valve arm.

The above and other objects and advantages of the present invention are attained by providing a glass float, which may be spherical or of any other suitable shape, having means for connecting same to the valve arm, the assembly being so arranged that it may be readily used in tanks in general or the like.

For this purpose the glass float is provided with a perimetric groove or depression into which is fitted a resilient guard so as to act as a protecting stop to avoid damage to said float.

In order that the invention may be more clearly understood and readily carried into practice, same has been illustrated by way of example and in a preferred embodiment in the accompanying drawing, wherein:

Fig. 1 is a partially sectional side view of the float, showing the simple structure and the fittings thereof; and Fig. 2 is a view showing the same float applied to a feed valve of a tank.

In both figures, the same reference characters have been used to indicate like or corresponding parts or elements.

As may be seen from the drawing, $a$ is a glass bulb constituting the body of the float, which in the present instance is spherical in shape, although it may have any other suitable shape or structure.

Inasmuch as it is intended to operate submerged in water, said bulb $a$ is provided with a beak 1 the open free end of which is closed by means of a stopper 2, made of rubber or other suitable material. Apart from the elongated portion serving to obturate said opening, the stopper also comprises a plate-like portion 2' serving to act as a packing against the edge of the mouth of beak 1. Said beak 1 is externally threaded as indicated at 1', so as to receive a correspondingly threaded portion of a gland-collar $b$. Said gland-collar $b$ has an enlarged portion 3 which is internally threaded so as to be screwed onto the threaded portion 1' of beak 1. Portion 4 of said gland-collar $b$, which is coaxial relative to beak 1, is internally threaded at 4' so as to receive the end of arm 5 to which the float constituted by the bulb $a$ is coupled.

Inasmuch as the portion 4 of said gland-collar $b$ has a smaller diameter than portion 3, said gland-collar has a step 6 the internal portion of which receives a cap 7 coinciding with the plate 2' of stopper 2.

After having applied the stopper 2 and cap 7, said gland-collar $b$ will act as a sealing element, as on being screwed onto the threaded portion 1' of beak 1, the step 6 will adjust tightly against the cap 7, which will in turn fit tightly against portion 2' of stopper 2, thereby offering a watertight seal.

The portion 4 of said gland-collar $b$ is longitudinally perforated throughout its length and internally threaded at 4', so that in receiving the end of the valve arm 5, said arm, which is threaded at 5' will enter said portion 4 until it engages said cap 7, thus securing the bulb to the gland-collar and also the entire float to the arm 5 of the feed valve $c$.

Located at one of the maximum circles of said bulb $a$ is a groove or depression 8, into which is fitted an annular guard 9. In the present instance said annular guard 9 is arranged transversal to the axis of said beak 1. Said guard 9 is made of rubber or other suitable material and presents a larger section than said groove 8, so as to project from the outer surface of said bulb and act as a protecting stop against any possible impacts.

In this manner, the glass bulb $a$, coupled to arm 5 of valve $c$ as shown in Fig. 2, will act as a perfect float so as to render said valve $c$ automatic. The latter valve is coupled to the water pipe 10 feeding tank $d$ in a known manner.

As is common in valves of this type, said valve $c$ is provided with an obturator 11 controlled by said arm 5 in such a manner that when said arm together with the float $a$ falls by its own weight due to a lowering of the water level within said tank $d$, said obturator will open and allow the passage of liquid from the pipe 10 through a spout 12 and into said tank $d$.

When the water level rises within tank $d$, the bulb *a* will be raised by flotation, thereby lifting said arm 5 and causing the closure of obturator 11 so as to cut off the feed of liquid until the level thereof is again lowered.

Inasmuch as said bulb *a* is hollow and of a certain volume, it is lighter than water and therefore behaves the same as any other float. While being made of glass, this float may be safely used in any tank without danger of damage or breakage, due to the effective coupling provided by the gland-collar *b* and also to the protection afforded by the guard 9 acting as a stop to avoid the surface of the glass from contacting the walls or other elements of tank *d*.

It is evident that in carrying the invention into practice, several modifications and changes will occur to those skilled in the art, without departing from the scope of the invention as clearly set forth in the appended claims.

What is claimed is:

1. Improvements in float structures characterized in that the float comprises a hollow glass bulb lighter than water and provided with an externally threaded beak connected to a gland-collar having means for coupling a float arm thereto, said beak having an orifice which is closed by a stopper formed by an obturating portion and a plate-like portion, the latter being seated against a cap located against a step formed in said gland-collar, and a float arm secured to the gland-collar coupling means and abutting said cap.

2. Improvements in float-structures characterized in that the float comprises a hollow glass bulb lighter than water and provided with an externally threaded beak connected to a correspondingly threaded gland-collar, said beak having an orifice which is closed by means of a stopper formed by an obturating portion and a plate-like portion, the latter being seated against a cap located against a step formed in said gland-collar, said gland-collar having an extension of smaller diameter having a threaded longitudinal perforation arranged to receive the threaded end of a float arm, said threaded end abutting against said cap.

3. Improvements in float-structures characterized in that the float comprises a hollow glass bulb lighter than water and provided with an externally threaded beak connected to a correspondingly threaded gland-collar, said beak having an orifice which is closed by a stopper formed by an obturating portion and a plate-like portion, the latter being seated against a cap located against a step formed in said gland-collar, the latter having an extension arranged to receive a float arm, said glass bulb having a perimetrical depression, and a resilient guard adapted to lie in said depression, said guard being of larger cross-section than said depression, so as to project therefrom.

4. Improvements in float structures as claimed in claim 3, wherein said depression is located at a maximum circle of said bulb and is transversal relative to the axis of said bulb beak.

FRANCISCO DIAZ POSADA.